Dec. 5, 1967    D. SCARAMUCCI    3,356,334
GATE VALVE AND SEAL

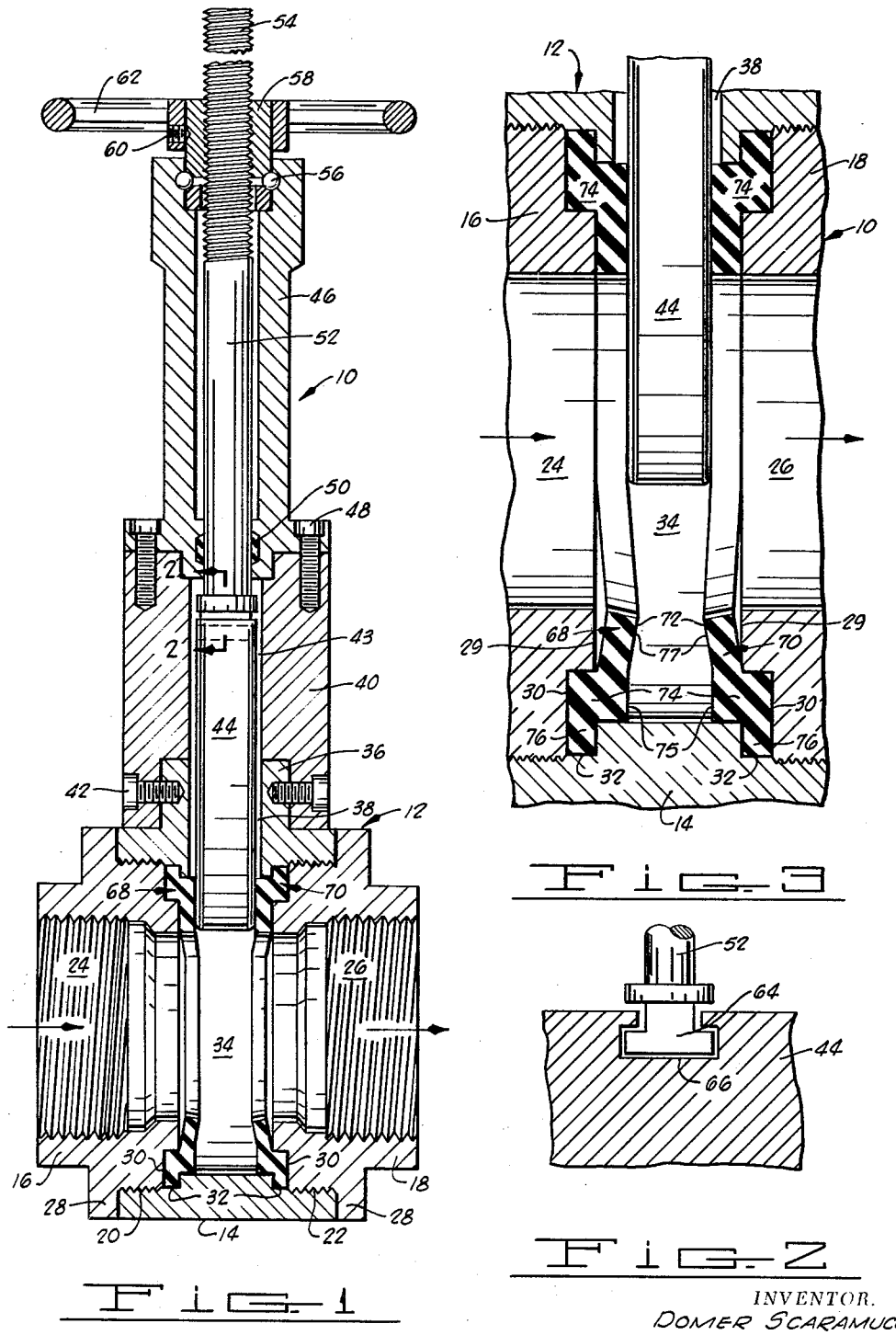

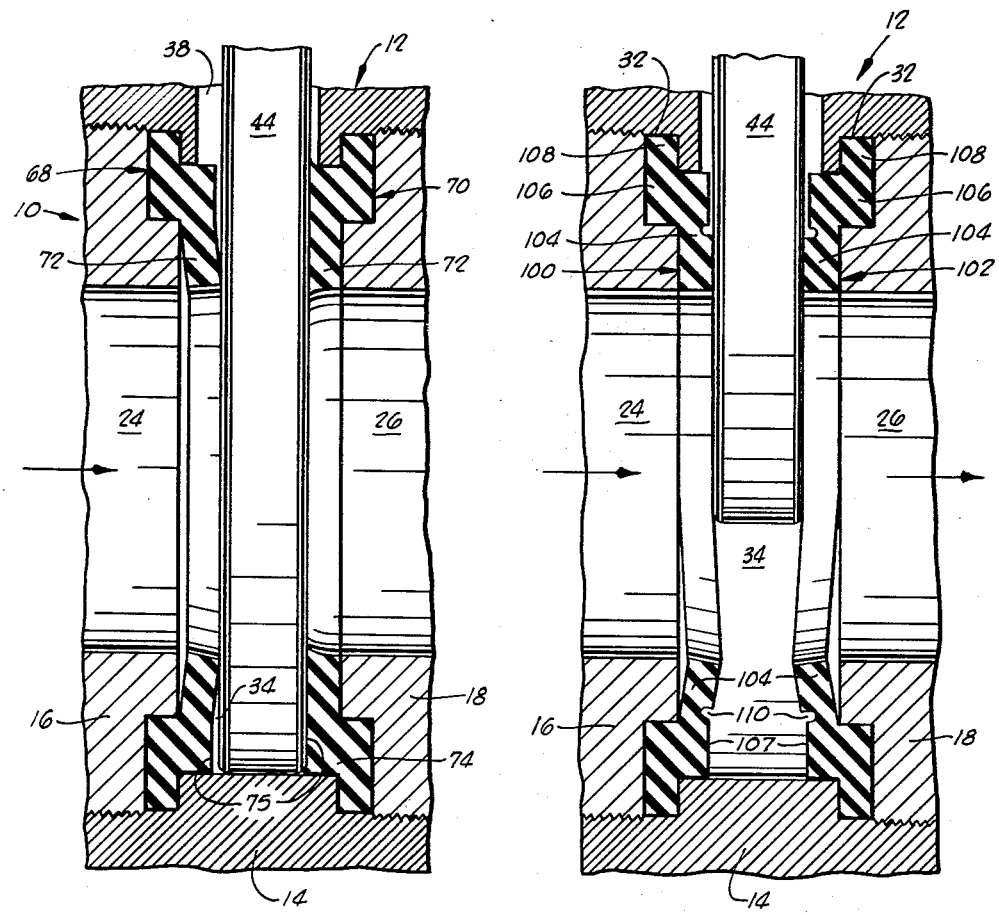

Filed May 17, 1965    3 Sheets-Sheet 3

INVENTOR.
DOMER SCARAMUCCI
BY
Dunlap and Laney
ATTORNEYS

United States Patent Office 3,356,334
Patented Dec. 5, 1967

3,356,334
GATE VALVE AND SEAL
Domer Scaramucci, 3245 S. Hattie,
Oklahoma City, Okla. 73129
Filed May 17, 1965, Ser. No. 456,404
24 Claims. (Cl. 251—172)

ABSTRACT OF THE DISCLOSURE

Gate valve seals for both high and low pressure service conditions. A seal is provided at both the upstream and downstream sides of the gate and each seal comprises a relatively inflexible seat portion to support the gate when the gate is closed, and a flexible lip portion extending radially inward to be forced against the gate by fluid pressure in the respective end of the valve. The lip portion, in its relaxed condition, extends into the path of movement of the gate to seal against the gate at low pressure conditions.

This invention relates generally to improvements in gate valves. More particularly, but not by way of limitation, this invention relates to an improved gate valve having improved seals therein.

Generally speaking, various forms of gate valves and valve seals have been constructed in the past which perform satisfactorily when the valve is used with relatively low pressure fluid. However, less satisfactory operation of the valves has been obtained when the valve is to be used with relatively high pressures.

One approach taken to construct a gate valve suitable for relatively high pressure use has been to provide a valve having a metallic gate member that seats and seals on a metallic valve seat. In this form of construction, the parts of the valve must be held to extremely close tolerances resulting in a valve that is extremely expensive and difficult to manufacture. Even when extremely close tolerances are held, most such valves will leak when the pressure in the system is reduced to a relatively low value.

In an effort to provide a gate valve which will seal at relatively low pressures and yet operate satisfactorily at relatively high pressures, soft elastomer seals have been provided with rigid reinforcing members generally constructed from metal. The rigid reinforcing members are provided to absorb the load imposed on the gate by the high pressure fluid and also to prevent the extrusion of the relatively soft seals from the valve. Some degree of success has been attained in constructing the valve in this manner due to the ability of the soft elastomer to provide an effective low pressure seal and due to the reinforcing which cooperates with the soft elastomer to provide a relatively effective high pressure seal. However, valves incorporating seals of this type have also been found to be relatively expensive to manufacture because of the multiple part construction of the seals.

Gate valves have also been manufactured utilizing relatively hard elastomers that have good load bearing characteristics as seal material when the valve is to be used with relatively high pressures. Manifestly, when the hardness of the seal material is increased to increase the load bearing characteristics of the material, a corresponding decrease in the sealing properties occurs. Stated another way, the relatively hard elastomers used for seal materials are less flexible and, therefore, less suitable for providing the seals required for low pressure service. Due to their lack of flexibility, seals of this type are also more susceptible to being damaged during movement of the gate and also to having foreign materials that may adhere to the gate become imbedded therein. The result of foreign materials becoming imbedded in the seals, or of the seals being damaged, is the ultimate failure of the seal to form a fluid-tight seal with the gate.

Economically, seals formed from relatively hard elastomers have not proved to be entirely satisfactory because of their short-service life. Also, they have not provided a satisfactory low pressure seal, even though, during their short-service life, they often provide a generally satisfactory high pressure seal.

This invention relates generally to an improved valve that includes a gate movably positioned in a valve body to open and close a flow passageway through the valve body and a pair of resilient annular seals on the opposite sides of the gate located between the gate and the valve body, wherein each of the seals has a flexible seal portion in sealing engagement with the gate and a seat portion engageable with the gate upon deformation of the seal portion. The seal portion is sufficiently flexible so that it is responsive to fluid pressure in the valve, whereby fluid pressure augments the sealing engagement between the seal portion and the gate. The seat portion is arranged, upon deformation of the seal portion, to support the load imposed on the gate resulting from a pressure differential existing across the valve.

One object of the invention is to provide an improved gate valve having seals therein that form fluid-tight seals at both low and high pressures.

Another object of the invention is to provide an improved gate valve having seals therein that form both an upstream and a downstream seal.

A further object of the invention is to provide an improved gate valve having seals therein that are constructed from a relatively hard elastomer and, yet, are responsive to fluid pressure in the valve to form a fluid-tight seal therein.

Still another object of the invention is to provide an improved gate valve having seals that form effective high and low pressure seals and, yet, permit the valve to be manufactured in a very economical manner.

A still further object of the invention is to provide an improved seal that is constructed from a relatively hard elastomer for use in gate valves, wherein the improved seal has both a load-bearing portion and a pressure responsive seal portion.

An additional object of the invention is to provide an improved gate valve seal that is adapted to effectively form a fluid-tight seal at both high and low pressures when installed in a valve.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a valve constructed in accordance with the invention;

FIG. 2 is an enlarged view, partly in cross-section and partly in elevation, illustrating in more detail a portion of the valve of FIG. 1;

FIG. 3 is an enlarged cross-sectional view of a portion of the valve of FIG. 1, but showing the valve in a different operating position;

FIG. 4 is a view similar to FIG. 3, but showing the valve in still another operating position;

FIG. 5 is a view similar to FIG. 3, illustrating another embodiment of seal, also constructed in accordance with the invention;

*Embodiment of FIGS. 1–4*

Figures 6, 7:
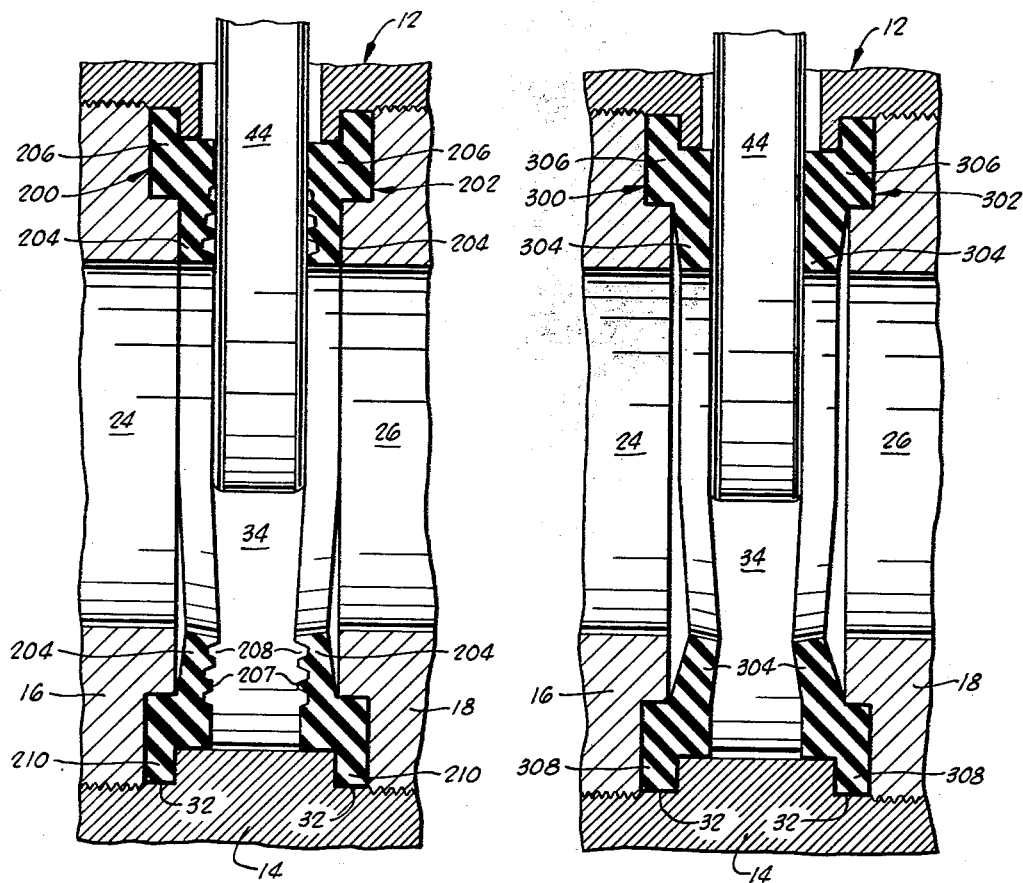
FIG. 6 is a cross-sectional view similar to FIG. 3, but showing additional embodiment of seal, also constructed in accordance with the invention.
FIG. 7 is a cross-sectional view similar to FIG. 3, but showing still another embodiment of seal, also constructed in accordance with the invention.

Referring to the drawings and to FIGS. 1–4, in particular, shown therein and generally designated by the reference character 10 is a gate valve, constructed in accordance with the invention. As illustrated in FIG. 1, the gate valve 10 includes a valve body 12 that has a center portion 14, an inlet portion 16, and an outlet portion 18. The central portion 14 is connected with the inlet portion 16 by threads 20, and the central portion 14 is connected with the outlet portion 18 by threads 22. A partially threaded inlet passageway 24 is provided in the inlet portion 16, and a partially threaded outlet passageway 26 is provided in the outlet portion 18. Although both the inlet and outlet portions 16 and 18, respectively, are illustrated as being threaded, but they may be provided with flanges or sleeve type fittings as desired to fit the particular application of the valve 10.

The inlet portion 16 and the outlet portion 18 each includes an exterior flange 28 that abuts the ends of the center portion 14 to control the depth of penetration of the inlet and outlet portions into the center portion 14. The ends 29 of the inlet portion 16 and of the outlet portion 18 disposed in the center portion 14 are each provided with an annular groove 30 for purposes that will be more fully explained hereinafter.

The center portion 14, which is generally tubular in configuration, is provided with a pair of annular recesses 32 that are disposed adjacent the annular grooves 30 in the inlet and outlet portions 16 and 18. The inlet portion 16, outlet portion 18, and center portion 14 cooperate to form a chamber 34 in the valve body 12. The inlet passageway 24, outlet passageway 26, and chamber 34 combined form a flow passageway that extends entirely through the valve body 12.

The center portion 14 is also provided on its exterior with a protuberance 36. The protuberance 36 is provided with an opening 38 that extends therethrough into the chamber 34. An adapter member 40 is connected by threaded fasteners 42 with the protuberance 36 and has an opening 43 extending therethrough in alignment with the opening 38 in the protuberance 36. The openings 38 and 43 are sized to receive a blade-like valve member or gate 44. A hollow extension 46 is connected to the upper end of the adapter member 40 by a plurality of fasteners 48. The lower end of the extension 46 is provided with a packing 50 that sealingly engages a valve operating member 52.

The valve operating member 52 is an elongated rod having the upper end threaded as shown at 54 and arranged at its lower end for connection with the gate 44 as will be described more fully hereinafter. The upper end of the extension 46 is provided with a thrust bearing 56 for rotatably mounting an operating nut 58. The nut 58 is threaded to mate with the threads 54 and is connected by a set screw 60 with an operating handle 62. As the handle 62 and nut 58 are rotated, the valve operating member 52 will be moved upwardly or downwardly in the valve 10 depending upon the direction of rotation of the handle 62.

As shown in FIG. 1, the openings 43 and 38 are wider than the thickness of the gate 44, thereby providing room for movement of the gate 44 in a direction parallel to the flow passageway through the valve 10. To permit the gate 44 to move relative to the operating member 52, the lower end of the operating member 52 is provided with a T-lug 64 (see FIG. 2) that is disposed in a T-shaped slot 66 in the upper end of the gate 44. As can be realized from viewing FIG. 2, the gate 44 will be moved upwardly and downwardly with the operating member 52, but, at the same time, may move relative to the member 52 in the slot 66 parallel to the flow passageway through the slot 66 parallel to the flow passageway through the valve 10.

As shown in FIG. 1, and more clearly in FIG. 3, the valve 10 also includes a resilient annular upstream seal 68 and a resilient annular downstream seal 70 disposed within the body 12 and on either side of the gate 44. The upstream seal 68 encircles the inlet passageway 24 and the downstream seal 70 encircles the outlet passageway 26. Each of the seals 68 and 70 includes a flexible, annular seal or lip portion 72 extending inwardly toward the flow passageway through the valve, and an annular seat portion 74.

The seat portion 74 of each of the seals is provided with an annular bead or flange 76 clamped in the respective recess 32 between the respective inlet or outlet portion 16 or 18 and the central portion 14 to retain the seals 68 and 70 within the valve body 12. The inner end of gate-engaging surface 75 of each seat portion 74 is substantially flat to support the gate 44 from the respective inlet portion 16 or outlet portion 18, as will be more fully described below. The seat portions 74 may be sized so that the distance therebetween is substantially the same as the thickness of the gate 44 or, if desired, slightly larger to permit a slight movement of the gate 44 parallel to the flow passageway extending through the body 12.

The annular lip portion 72, in the unstressed state as shown in the lower portion of FIGS. 1 and 3, extend angularly from their respective seat portions 74 into the chamber 34 relatively away from the inlet portion 16 and the outlet portion 18. In the preferred form of the invention, the free ends (inner peripheries) of the lips 72 are spaced so that the distance therebetween (the distance between the gate-engaging surfaces 77 thereof), will be less than the thickness of the gate 44. It should also be noted that the inner diameter of each of the seals 68 and 70 is substantially equal to the diameter of the respective inlet 24 or outlet 26 so as not to restrict the flow of fluid through the valve when the valve is open.

In the preferred form of the invention, the seals 68 and 70 are constructed from a relatively hard elastomer. For example, the types that have been found to be satisfactory are synthetic and natural rubber in the hardness range of about 80 to 90 durometer and various synthetic resins, such as nylon, Teflon or Derlin.

*Operation of the embodiment of FIGS. 1–4*

As illustrated in FIG. 1, the valve 10 is in the open position, that is, the gate 44 is raised to a position wherein it is completely clear of the flow passageway extending through the body 12. When the valve 10 is to be closed, the handle 62 is rotated to move the operating member 52 relatively downwardly in the extension 46, driving the gate 44 downwardly therewith.

As shown more clearly in FIG. 3, the gate 44 moves downwardly between the seals 68 and 70 into the chamber 34, deforming the flexible lips 72 relatively toward the inlet portion 16 and the outlet portion 18. The engagement between the flexible lip portions 72 and the valve gate 44 forms a fluid-tight seal therebetween. When the gate 44 reaches the position shown in FIG. 4, the fluid passageway through the valve 10 is completely closed. It has been found that the flexible lip portions 72 are highly effective in forming a low pressure fluid seal with the gate 44.

When the valve 10 is closed and a high pressure is applied in the inlet passageway 24, the gate 44 moves in a direction parallel to the flow passageway through the valve, deforming the downstream seal 70 as shown in FIG. 4. The gate 44 is then in sealing engagement with the surfaces of both the seal portion 72 and the seat portion 74 of the downstream seal 70 by virtue of the gate being pressed hard against the downstream seal.

During the movement of gate 44 downstream, the flexible lip 72 on the upstream seal 68 continues to maintain a seal with the gate 44, due to the resiliency of the seal material biasing the flexible lip 72 into engagement with the gate 44, and also, due to the pressure responsiveness of the flexible lip 72. It can be appreciated from viewing FIG. 4 that the pressure in the inlet 24 will act on the flexible lip 72 of the upstream seal 68 to maintain the lip 72 in sealing engagement with the gate 44. Thus, the seals 68 and 70 provide both upstream and downstream fluid-tight seals with the gate 44.

All of the embodiments of seal illustrated are shown as being utilized in the valve 10. Therefore, the same reference characters previously assigned will be used in connection with the valve and new reference characters are assigned only to the seals. Also, all the various embodiments of the seal utilize the same materials as described in connection with the seals of FIGS. 1-4 and, therefore, no further discussion will be made with respect to seal materials.

Embodiment of FIG. 5

Referring now to FIG. 5, shown therein is an upstream seal 100 and a downstream seal 102 disposed in the valve body 12. The seals 100 and 102 are identical, but oppositely disposed, and each includes a radially inwardly extending flexible annular seal or lip portion 104 and a seat portion 106. The gate-engaging surface 107 of each seat portion is substantially flat. Each of the seals is also provided with an annular bead or flange 108 disposed in the annular recess 32 of the valve body to retain the seals 100 and 102 therein.

It will be noted in FIG. 5 that the seal or lip portions 104 extend angularly from the seat portions 106 into the chamber 34 and relatively away from the inlet portion 16 and outlet portion 18. The lip portions 104 extend axially in the valve chamber 34, toward one another a sufficient distance so that in their relaxed positions (as shown in the lower portion of FIG. 5), they will be spaced a distance less than the thickness of the gate 44.

As also shown in FIG. 5, the lip portion 104 and the seat portion 106 of each seal are separated by an annular groove 110 in the gate-engaging surface of the seal. Each groove 110 serves to increase the flexibility of the respective lip portion 104 and to promote the formation of a better seal between the lip portion 104 and the gate 44.

As shown most clearly in the upper portion of FIG. 5, the seat portions 106 are sized so that the distance therebetween is slightly greater than the thickness of the gate 44, whereby only the lip portions 104 will be in engagement with the gate 44 in low pressure service and during opening and closing of the gate 44. However, when the gate 44 is in the fully closed position (not shown) and a considerable differential in pressure exists between the inlet passageway 24 and outlet passageway 26 so that the gate 44 is shifted toward the outlet passageway 26, deformation of the lip portion 104 of the downstream seal 102 will permit the gate 44 to engage the respective seat portion 106. Under these circumstances, the gate 44 will be supported by the seat portion 106 and the lip portion 104 of the downstream seal 102. With the gate 44 shifted toward the downstream seal 102, it can be realized that a fluid-tight downstream seal will be formed between the seal 102 and the gate 44 due to the compressive load exerted by the gate 44.

As was true with the upstream seal 68 of FIG. 1, the lip portion 104 of the upstream seal 100 will be biased by the resiliency of the seal material, and by the influence of pressure in the inlet passageway 24, into sealing engagement with the gate 44. Thus, it can be seen that the seals 100 and 102 will form fluid-tight upstream and downstream seals with the gate 44 to effectively prevent the flow of fluid thereby under the influence of either low or high pressure.

The embodiment of FIG. 6

Referring now to FIG. 6, shown therein is an annular upstream seal 200 and an annular downstream seal 202 that is identical to the seal 200 though oppositely disposed in the valve body 12. The seals 200 and 202 each include a radially inwardly extending lip or seal portion 204 and a seat portion 206.

The lip portion 204 of each of the seals extends angularly from its respective seat portion 206 into the chamber 34 and relatively away from the inlet portion 16 and the outlet portion 18. In the relaxed condition of the seals 200 and 202 as shown in the lower portion of FIG. 6, the lip portions 204 are spaced a distance apart less than the thickness of the gate 44.

It should be pointed out in FIG. 6 that the gate-engaging surfaces 207 of lip portions 204 are provided with a plurality of annular grooves 208. As illustrated, the grooves 208 vary in depth, beginning with the groove adjacent the seat portion 206 and progressively increasing toward the fluid passageway of the valve 10. If desired, the grooves 208 may all be of equal depth, but it has been found that the progressive deepening of the grooves increases the low pressure sealing ability of the seals 200 and 202. Also, the seals are more responsive to fluid pressure due to their greater flexibility.

The seat portions 206 are each provided with an annular bead 210 disposed in the annular recesses 32 in the valve body 12 to retain the seals 200 and 202 therein.

Upon closure (not shown) of the gate 44, the lip portions 204, due to their increased flexibility, form a more effective low pressure seal with the gate 44. It can also be appreciated, that under the influence of a relatively high differential pressure existing between the inlet passageway 24 and the outlet passageway 26, the lip portion 204 of the downstream seal 202 will be deformed more easily, permitting the gate 44 to move into engagement with the downstream seat portion 206.

It should be pointed out, however, that the upstream seal 200 forms an effective fluid-tight upstream seal with the gate 44. The lip portion 204 of the upstream seal 200 is biased into engagement with the gate 44 under the influence of fluid pressure in the inlet passageway 24. Stated in another way, the increase in the flexibility of the upstream lip portion 204 (resulting from the grooves 208) provides a lip portion 204 that more easily responds to pressure to engage the gate 44, augmenting the seal formed by the lip 204 due to the resiliency of the seal material.

Embodiment of FIG. 7

Referring now to FIG. 7, shown therein is an upstream seal 300 and a downstream seal 302 that are identical though oppositely disposed in the body 12. Each of the seals 300 and 302 includes a radially inwardly extending seal or lip portion 304 and a seat portion 306.

As may be seen most clearly in the lower portion of FIG. 7, the lip portions 304 extend angularly upwardly from their respective seat portions 306 into the chamber 34 relatively away from the inlet portion 16 and the outlet portion 18. The lip portions 304 extend axially into the chamber 34 to such an extent that the space therebetween is less than the thickness of the gate 44. It can also be observed in FIG. 7, and particularly in the upper portion thereof, that the lip portions 304 are of greater thickness at the juncture between the lip portions 304 and the seat portions 306. The taper provided in each of the lip portions 304 increases their flexibility, and, consequently, their pressure responsiveness.

Each of the seat portions 306 is provided with an annular bead 308 disposed in the respective recess 32 in the valve body 12 to retain the seals 300 and 302 therein.

As shown in FIG. 7, the flexible lip portions 304 will not support the load imposed by the gate member 44. Therefore, upon initial deformation of the lip portions 304, the load of the gate 44 is supported by the seat portions 306. The surface of the seat portion 306 of the downstream seal 302 that is in engagement with the gate 44 provides the downstream seal in the embodiment of FIG. 7.

When the gate 44 is in the fully closed position and a relatively high differential is imposed across the valve 10, the lip portion 304 of the upstream seal 300 will be biased by the resiliency of the seal material into engagement with the gate 44. In addition, the pressure responsiveness of the lip portion 304 of the upstream seal 300 augments the sealing engagement of the lip portion 304 with the gate 44. Therefore, both upstream and downstream fluid-tight seals are formed by the seals 300 and 302.

Figure 8:
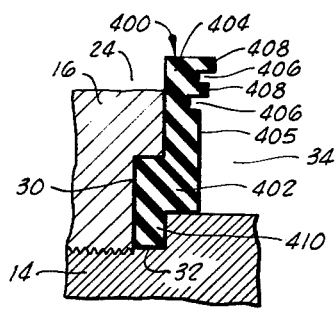
FIG. 8 is a partial cross-sectional view through another embodiment of seal and the adjacent portions of the valve body.

*Embodiment of FIG. 8*

FIG. 8 illustrates still another form of seal 400 constructed in accordance with this invention. The seal 400 is illustrated as an upstream seal, although it will be understood that a similar seal structure could be used as a downstream seal.

The seal 400 is an annular member having a seat portion 402 and a radially inwardly extending lip portion 404. In this embodiment, the lip portion 404 extends radially inward of the walls of the inlet passageway 24 into the path of fluid flowing or attempting to flow through the valve. Thus, the lip portion 404 presents an increased area responsive to upstream fluid pressure, whereby the seal will be more pressure responsive than the embodiments previously discussed. The gate-engaging face 405 of the lip portion 404 is provided with a series of concentric annular grooves 406 and lands or beads 408. The lands 408 extend axially into the valve chamber 34 a sufficient distance to be distorted by the gate upon closing of the valve in which the seal is used to provide a low pressure, compressive type seal. It may also be noted that the radially innermost land 408 extends further into the valve chamber 34 than does the outer land 408. When the valve is closed, the inner peripheral portion of the lip portion 404 is free to flex upstream upon distortion of the lands 408.

A circumferential flange 410 is formed around the seat portion 402 and is clamped in the recess 32, whereby the seal 400 will be retained in operating position.

As set forth in the detailed descriptions of the various embodiments, the seals installed in valves constructed in accordance with the invention substantially reduce the tolerances required in manufacturing the valves by virtue of the resiliency of the seal materials and due to the structural arrangement of the seals. There is described herein a valve and seal construction that permits the use of relatively hard, resilient seal material and, yet, effectively forms fluid-tight seals in the valves when used with either relatively high or relatively low pressure fluids.

It should be understood that the embodiments described herein are presented by way of example only and many modifications and changes can be made therein without departing from the spirit of the invention or from the scope of the annexed claims.

What I claim is:

1. A gate valve comprising:
   a body having an inlet and an outlet and a valve chamber communicating with the inlet and outlet and of larger diameter than the inlet and outlet;
   a gate moveable across the valve chamber for opening and closing the valve; and
   a resilient annular seal in the valve chamber between the gate and the inlet and encircling the inlet having:
      a relatively inflexible annular seat portion extending from the valve body axially into the valve chamber and having the end thereof facing the gate shaped substantially flat to support the gate when the gate is closed, and
      an annular, flexible lip portion extending radially inward from the seat portion exposed to the pressure of fluid in said inlet to be pressed against the gate when the gate is closed and form an upstream seal.

2. A valve as defined in claim 1 wherein the inner peripheral portion of said lip portion, in the relaxed condition of the seal, is extended into the path of movement of the gate to sealingly engage the gate when the gate is closed.

3. A valve as defined in claim 2 wherein said lip portion, in the relaxed condition thereof, extends from said seat portion at an angle away from the inlet.

4. A valve as defined in claim 2 wherein said lip portion extends radially inward of the periphery of the inlet and is thicker at its inner periphery than at its outer periphery.

5. A valve as defined in claim 4 wherein the face of said lip portion facing the gate is provided with an annular groove therein adjacent the inner periphery of the lip portion.

6. A valve as defined in claim 1 wherein an annular groove is provided in the end of the seal facing the gate between said seat and lip portions.

7. A valve as defined in claim 1 wherein a plurality of concentric annular grooves are provided in the face of the lip portion facing the gate.

8. A valve as defined in claim 7 wherein said grooves are progressively increased in depth toward the inner periphery of the lip portion.

9. A valve as defined in claim 1 wherein the face of said lip portion remote from the gate is tapered away from the inlet toward the inner periphery thereof in the relaxed condition of the seal.

10. A gate valve comprising:
    a tubular body portion having an upstream end and a downstream end and a counterbore in the upstream end thereof, said body portion forming a valve chamber therein;
    a tubular inlet portion secured to the upstream end of the tubular body portion forming an inlet for the valve;
    a tubular outlet portion secured to the downstream end of the tubular body portion forming an outlet for the valve;
    a gate moveable transversely across the valve chamber for opening and closing the valve; and
    an annular, resilient material seal positioned in the valve chamber between the gate and the tubular inlet portion having:
       a relatively inflexible annular seat portion extending from the tubular inlet portion toward the gate and having the end thereof facing the gate shaped substantially flat to support the gate from the tubular inlet portion,
       a circumferential flange extending into said counterbore and clamped between the tubular inlet portion and the tubular body portion, and
       an annular, flexible lip portion extending radially inward from the seat portion into the path of movement of the gate and exposed to the pressure of fluid in the tubular inlet portion to sealingly engage the gate.

11. A gate valve comprising:
    a valve body having a flow passageway therethrough including an inlet, an outlet, and a chamber intersecting said inlet and outlet, said chamber being elongated in a direction transverse to said passageway;
    a gate valve member positioned in said chamber and movable therein from a first position wherein said passageway is closed to a second position in said elongated chamber wherein said passageway is open; and,
    a pair of resilient annular seals located in the chamber in said valve body, one of said seals encircling said inlet and the other said seal encircling said outlet, each of said seals having a flexible annular lip portion disposed adjacent said flow passageway, said lip portion having a surface thereon in sealing engagement with said valve member when said valve member is in said first position, said lip portion being responsive to fluid pressure in the respective inlet or outlet whereby the pressure augments the sealing engagement between said seal portion and the valve member, and a seat portion secured in said valve body and engageable with said valve member upon deformation of said lip portion to support the load imposed on said valve member resulting from a pressure differential in said inlet and outlet.

12. The valve of claim 11 wherein each of the seals also includes an annular groove in the surface of the seal adjacent said valve member, said groove separating said lip portion from said seat portion.

13. The valve of claim 11 wherein said surface of said lip portion includes a plurality of annular grooves.

14. The valve of claim 13 wherein the annular grooves are of progressively increasing depth beginniing with the groove adjacent said seat portion.

15. The valve of claim 11 wherein the seals are constructed from an elastomer having a hardness of from about 80 to 90 durometer.

16. The valve of claim 11 wherein the seals are constructed from a resilient synthetic resin.

17. The valve of claim 11 wherein said annular lip portions are tapered having the thickest dimension at the juncture between said lip portion and seat portion.

18. A gate valve comprising:

a valve having a fluid passageway extending therethrough including an inlet, an outlet, and a chamber connecting said inlet and outlet, said chamber being elongated in a direction transverse to said passageway, said body also having a pair of annular recesses adjacent said chamber, one of said recesses encircling said inlet and the other said recess encircling said oulet;

a gate valve member disposed in said chamber and movable from a first position closing said passageway to a second position wherein said passageway is open;

operating means extending through said valve body into said chamber and operably connected with said valve member to move said valve member between the first and second positions and arranged to permit movement of said valve member parallel to said flow passageway; and a pair of annular valve seals constructed from a resilient synthetic resin positioned in said chamber on opposite sides of the gate valve member, each of said seals having a flexible annular lip portion having a surface thereon in sealing engagement with said valve member when said valve member is in said first position, said lip portion being responsive to fluid pressure in the respective inlet or outlet whereby the pressure augments the sealing engagement between said seal portion and the valve member, and a relatively inflexible annular seat portion retained in the respective annular recess and engageable with said valve member upon deformation of said lip portion to support the load imposed by said valve member as said valve member moves parallel to said passageway as a result of a pressure differential between said inlet and outlet.

19. A resilient, annular gate valve seal comprising:

a relatively inflexible annular seal portion having a substantially flat gate-engaging face, and a flexible annular, pressure responsive lip portion extending radially inward from the seat portion and having a gate-engaging face, at least a portion of the gate-engaging face of the lip portion protruding axially beyond the gate-engaging face of the seat portion.

20. A seal as defined in claim 19 characterized further to include an annular groove therein between the seat engaging faces of the seat and lip portions to increase the pressure responsiveness of the lip portion.

21. A seal as defined in claim 19 characterized further to include a plurality of concentric grooves in the seat-engaging face of the lip portion.

22. A seal as defined in claim 21 wherein said concentric annular grooves are increased in depth from the outer toward the inner periphery of the lip portion.

23. A seal as defined in claim 19 wherein the seal is a molded elastomer having a durometer of from about 80 to 90.

24. A seal as defined in claim 19 wherein the seal is formed of a synthetic resin.

References Cited

UNITED STATES PATENTS

| | | | |
|---|---|---|---|
| 2,853,269 | 9/1958 | Shand | 251—174 X |
| 2,857,129 | 10/1958 | Overholser | 251—172 |
| 2,985,422 | 5/1961 | Anderson | 251—172 |
| 3,000,608 | 9/1961 | Williams | 251—328 X |
| 3,016,062 | 1/1962 | Zinniger | 251—315 X |
| 3,185,436 | 5/1965 | Rovang | 251—172 |

FOREIGN PATENTS 675,565  12/1963  Canada.

CLARENCE R. GORDON, *Primary Examiner.*